US009339042B2

(12) United States Patent
Heston

(10) Patent No.: US 9,339,042 B2
(45) Date of Patent: May 17, 2016

(54) CARCASS WEIGHT CONTROL

(75) Inventor: Rodney W. Heston, Ankeny, IA (US)

(73) Assignee: LP SOLUTIONS LLC, Ankeny, IA (US)

( * ) Notice: Subject to any disclaimer, the term of this patent is extended or adjusted under 35 U.S.C. 154(b) by 312 days.

(21) Appl. No.: 13/431,491

(22) Filed: Mar. 27, 2012

(65) Prior Publication Data

US 2013/0255282 A1 Oct. 3, 2013

(51) Int. Cl.
*F25D 17/02* (2006.01)
*A22B 5/00* (2006.01)
*A22B 7/00* (2006.01)

(52) U.S. Cl.
CPC ........... *A22B 5/00* (2013.01); *A22B 5/0076* (2013.01); *A22B 7/002* (2013.01); *A22B 7/007* (2013.01)

(58) Field of Classification Search
CPC ........ A22B 5/00; A22B 5/0076; A22B 7/002; A22B 7/007; F25D 2331/804; A22C 17/08
USPC ............... 62/62, 64, 63; 452/177, 198, 173; 99/516, 517
See application file for complete search history.

(56) References Cited

U.S. PATENT DOCUMENTS

| | | | |
|---|---|---|---|
| 3,634,096 A * | 1/1972 | Ferrarini | 426/231 |
| 4,300,644 A | 11/1981 | Meyn | |
| 4,597,495 A | 7/1986 | Knosby | |
| 4,791,790 A * | 12/1988 | Tongu | 62/476 |
| 5,781,112 A | 7/1998 | Shymko | |
| 6,481,220 B2 | 11/2002 | Butler | |
| 6,550,267 B2 | 4/2003 | Maxwell et al. | |
| 2003/0037563 A1 | 2/2003 | Maxwell | |
| 2003/0234630 A1 * | 12/2003 | Blake | 318/471 |
| 2004/0117330 A1 * | 6/2004 | Ehlers | F24F 11/0012 705/412 |
| 2007/0278319 A1 * | 12/2007 | Jenkins et al. | 236/15 A |
| 2008/0087475 A1 * | 4/2008 | Petrucelli | 177/201 |
| 2009/0004958 A1 * | 1/2009 | Katori et al. | 452/177 |
| 2010/0055270 A1 * | 3/2010 | Glascock et al. | 426/332 |
| 2011/0105001 A1 | 5/2011 | Nieuwelaar | |
| 2012/0123595 A1 * | 5/2012 | Bower et al. | 700/282 |
| 2012/0244261 A1 * | 9/2012 | Harvey | A23L 1/3155 426/231 |
| 2014/0035730 A1 * | 2/2014 | Dando et al. | 340/10.1 |

FOREIGN PATENT DOCUMENTS

WO 2009151597 A1 12/2009

OTHER PUBLICATIONS 8 pages, of Notification of International Search Report and Written Opinion of PCT/US2013/033695—corresponding to US application.
7 pages, of Notification of International Search Report, Int'l Preliminary Report on Patentability and Written Opinion of the ISA for PCT/US2013/033695—corresponding to US application.

* cited by examiner

*Primary Examiner* — Marc Norman
*Assistant Examiner* — Ana Vazquez
(74) *Attorney, Agent, or Firm* — Sturm & Fix LLP

(57) ABSTRACT

Provided, is a fully integrated system to monitor and control carcass weight to minimize weight loss in carcasses during the chilling cycle. This will be accomplished by incorporating a load cell and a radio frequency identification device on the trolley operating on the elevated track system extending through the packing plant, including the carcass chilling rooms. This method and apparatus will provide the needed location and weight data to control a water spray system to maintain a constant carcass weight during the entire chilling cycle.

7 Claims, 4 Drawing Sheets

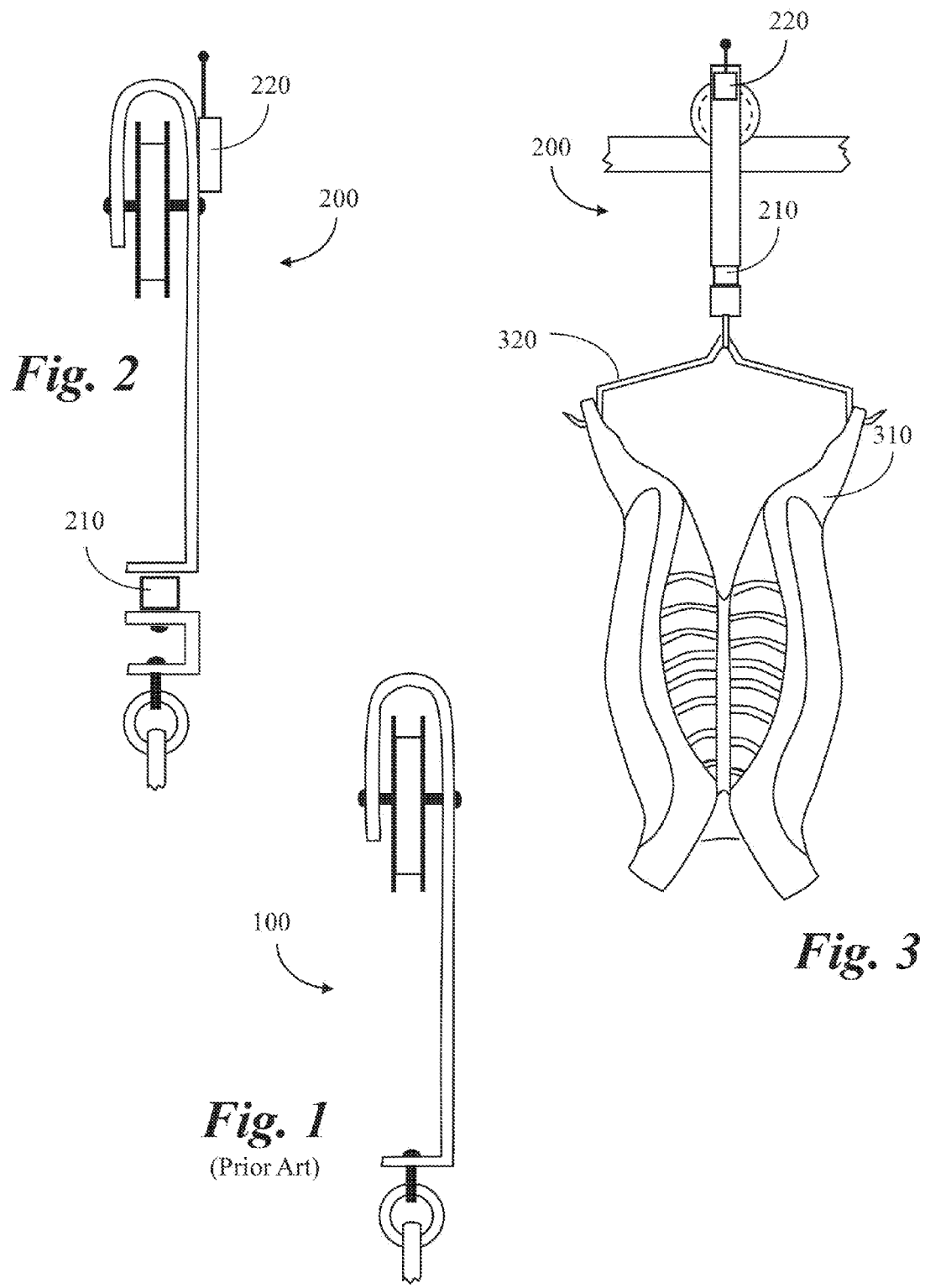

CARCASS WEIGHT CONTROL

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the real time monitoring and weight adjusting of the food and meat producing animals. This system provides data needed to control the facility water spray and refrigeration system to maintain carcass weight and reduce carcass shrinkage.

2. Background Art

As part of the processing of meat, carcasses are hung on trolleys 100, such as that shown in FIG. 1, that are guided along an elevated track through the packing plant. The elevated track passes through cooling facilities, where the carcasses are chilled and moistened.

A challenge in the chilling process is that of maintaining carcass weight. The system in use today makes use of a single scale located on the facility's track system. Selected carcasses are diverted to the single scale where each carcass is weighed and tagged before the chilling process starts. These data are kept for later reference. After a selected carcass is identified and weighed, it is sent back to the main track system, then to the chilling room or carcass cooler. In the chilling room, all the carcasses are refrigerated and sprayed with chilled water to drop the internal temperature of the carcasses to the desired processing temperature. The time required for chilling can vary from hours to days, depending upon the product. The required chilling time notwithstanding, when the identified (pre-weighed and tagged) carcasses leave the carcass cooler, they will be diverted to the scale and reweighed. The difference in the entering weight and leaving weights of the carcasses will be used to adjust the refrigeration and spray equipment. This method for controlling weight loss is effective, and loss due to shrinkage in most facilities averages 0.8% to 1.5% weight reduction on all carcasses.

However, even the apparently low loss of 0.8% to 1.5% for each carcass results overall in thousands of pounds and millions of dollars due to the total mass of meat processed. Many variables during the chilling process affect the rate of weight loss. Because of the complexity of the problem and the regulations prohibiting suppliers from having weight gain (carcasses weighing more after the chilling process), the industry has accepted the current loss averages. However, the losses in weight and revenue remain.

There is, therefore, a need for a method and apparatus for providing real-time monitoring and constant weight adjusting to minimize carcass weight loss while avoiding carcass weight gain.

BRIEF SUMMARY OF THE INVENTION

An object of the present invention is to provide a method and apparatus for reducing carcass weight loss during carcass cooling. Another object of this invention is to avoid carcass weight gain. Still another object is to archive data that will help design future effective chilling and moistening processes.

By use of real-time monitoring and continuous adjustment of the spraying process, the variables affecting shrinkage can be handled, and the product weight loss reduced significantly.

In the preferred embodiment of the present invention, selected trolleys located on a track system in a processing facility, are designed to include a wireless (remote readable) load cell to provide a continuous, real-time weight measurement of the carcass hanging thereon during the entire chilling process. The same selected trolleys are also fitted with Radio Frequency Identification (RFID) to provide the location of the carcasses hanging on the selected trolleys while in the carcass cooler. For the purposes of this document, including the claims, the term selected trolley is hereby defined to mean a carcass trolley outfitted with a load cell and RFID module.

Both the weight and the carcass location information are sent, stored, displayed, and used to tune the operating controller/computer. The identification, address (location) of each selected trolley and the carcass weight are displayed on a display screen as the trolley enters the chill cooler and stops at the location it will reside for the chilling process. The complete chiller room layout, or floor plan, and the facility carcass spray system with all sprays and zones are displayed on the display screen for operators and managers.

As the chilling process begins, the carcasses begin to lose weight while, at the same time, carcass temperature drops. Based on the instantaneous weight measurement taken by the load cell on the selected trolleys, the program detects this weight loss and energizes an appropriate spray zone solenoid valve, hence the reason for the RFID. Most chill coolers have multiple spray zones due to size and location restraints.

The spray in the relevant zone operates until the selected carcass returns to its original weight as reported by the selected trolleys' load cells. If multiple selected trolleys and carcasses are located in this particular spray zone, the computer program uses all the data to determine the status of the spray solenoid and spray time length.

With this invention, a minimum of one selected trolley with its carcass is required to provide data for each of the water spray zones. However, any number of selected trolleys can be used to control spray zones. This also will be beneficial to meet government and individual plant requirements.

The computer program provides historical data on all the selected trolley locations, carcass weights, and spray zone operations, including number of spray cycles, frequency of spray cycles, and length of spray cycles. By storing and having access to these data, normal operating patterns will develop and any major deviations may be addressed. These historical data are also used to design duplicate or similar systems.

For the purposes of this document, including the claims, the term instantaneous weight is hereby defined to connote the most recent weight value of a carcass measured by the load cell on the selected trolley. Because the present invention is most likely to be carried out digitally, as opposed to using analog signals representing weights, weight measurements are taken at discrete times. The instantaneous weight is, then, updated on a frequent, probably periodic, basis.

For the purposes of this document, including the claims, the word carcass is hereby defined to mean the animal matter hung on a single trolley. Hence, carcass may connote a part of one animal carcass such as when a side of beef is hung on a single trolley. Carcass may also imply multiple animal carcasses if more than one animal carcass or parts of multiple carcasses are hung on a single trolley.

Other objects, advantages and novel features of the present invention will become apparent from the following detailed description of the invention when considered in conjunction with the accompanying drawings.

BRIEF DESCRIPTION OF THE DRAWINGS

FIG. 1 shows a trolley of the prior art;
FIG. 2 shows a trolley with wireless RFID and wireless load cell integrated to its design;
FIG. 3 shows a trolley of the present invention carrying a carcass.

DETAILED DESCRIPTION OF THE INVENTION

Figure 4:
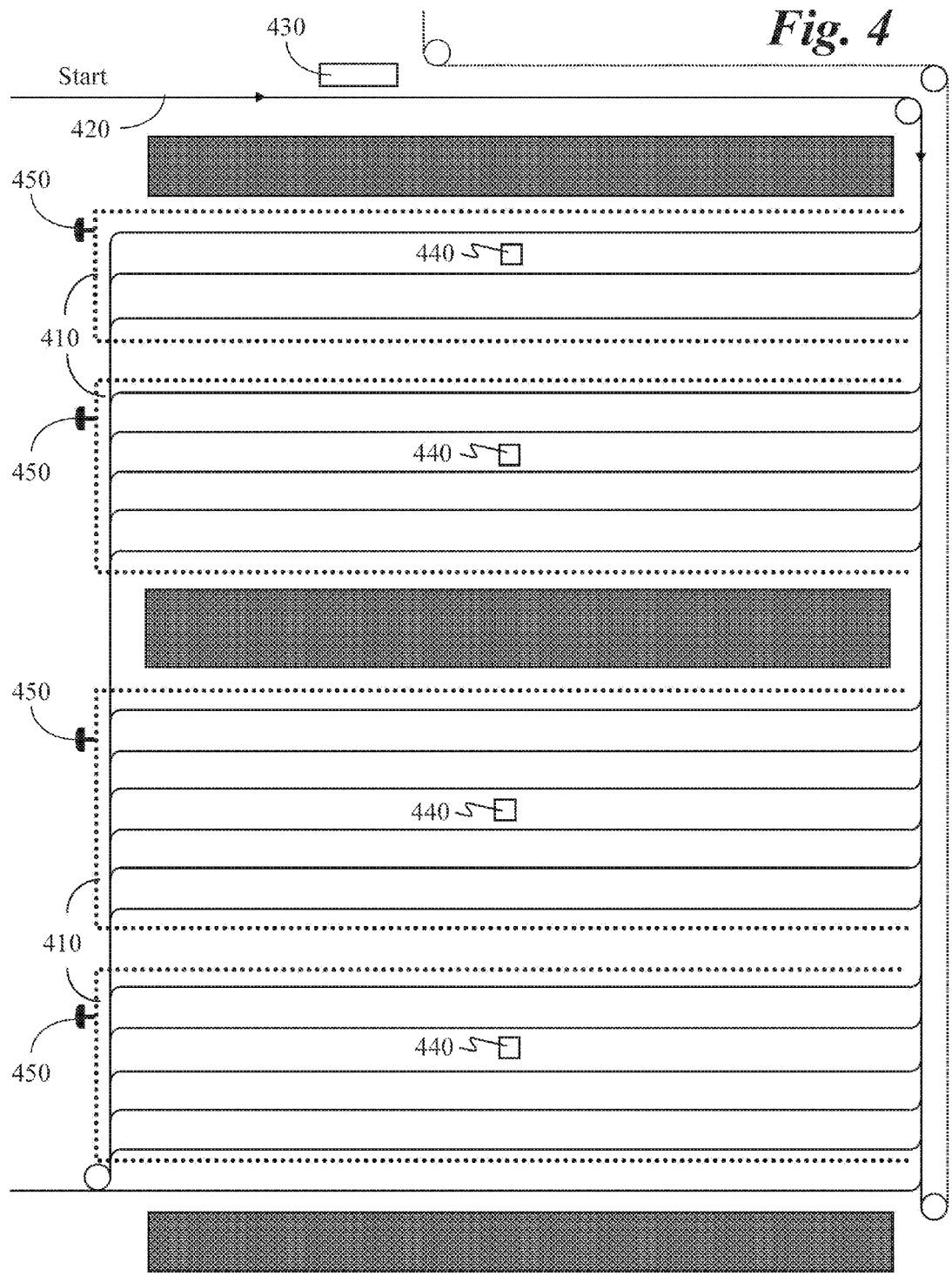
FIG. 4 shows carcass chill room rail system, RFID readers, and water spray zones.

A selected trolley 200, essentially a trolley of the prior art with the addition of instrumentation according to the present invention, is shown in FIGS. 2 and 3. Each of said selected trolleys 200 is intended to carry at least a part of a carcass 310, usually with the use of a gambrel 320. The instrumentation integrated into each selected trolley 200 includes a wireless load cell 210, to provide carcass weight information, and a wireless Radio Frequency Identification (RFID) module—or, alternatively, a transponder—220, to provide identification and location information. The number of these selected trolley assemblies 200 required in a given plant is determined by the size of the facilities in which they are used. However, at least one selected trolley 200 is required at each spray zone 410 (FIG. 4) in use.

FIG. 4 illustrates a typical rail system 420 on which the selected trolleys 200 and non-selected trolleys carrying carcasses 310 operate. FIG. 4 is intended to depict a typical carcass cooler. The carcasses 310 on the trolleys enter the cooler on the rail 420 at the upper left hand corner of FIG. 4. A RFID reader 430 detects the identification and initial weight of the carcasses 310 on the selected trolleys 200. It also causes the initialization of the receivers 440 in each spray zone 410. These receivers 440 track the selected trolleys 200 and monitor their movement until the selected trolleys 200 stops in one of the four spray zones 410. Thereafter, they may receive the transmitted data from each of the selected trolleys 200 in their respective spray zones 410. Alternatively, a central wireless receiver (not shown) may collect the data from all the selected trolleys 200 in the plant. Each of the selected trolleys 200 provides its own unique signal for its location and carcass weight. The received data are acquired by a computer 510 (FIG. 5) throughout the chilling process. This information is used to energize appropriate solenoid-actuated water spray valves 450 for each of the spray zones 410. The program will start (open the spray valve 450) and stop (close the spray valve 450) the water spray 530 (see FIG. 5) in a given spray zone 410 as needed to maintain a constant carcass weight. The system will spray all the carcasses 310 in the spray zone 410, detecting the weight loss on the selected trolley or trolleys. If there are multiple selected trolleys 200 in a particular spray zone 410, the spray valve 450 will be opened only if all the selected trolleys 200 in that spray zone 410 detect a weight loss. This reduces the chance of weight gain (carcasses 310 weighing more leaving than entering). If facility requirements allow for averaging carcass weights, the spray zones 410 will be operated based on the combined average of the carcass weights on all the selected trolleys 210 in that zone. Each spray zone 410 will require a minimum of one selected trolley 200 to operate properly.

Figure 5:
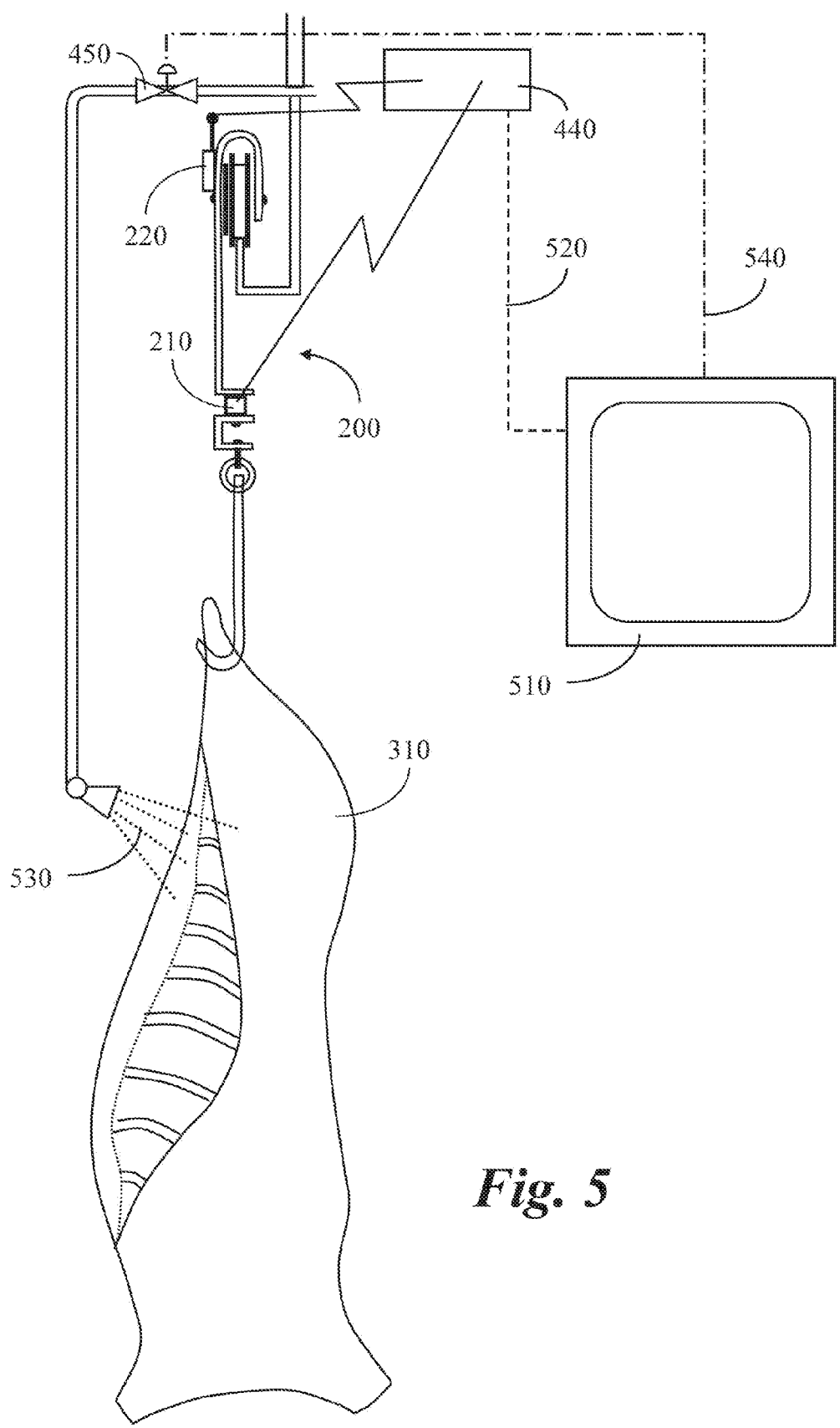
FIG. 5 shows a carcass under spray and a computer.

A carcass 310 hung from a selected trolley 200 under spray 530 is shown in FIG. 5. Signals from the wireless load cell 210 and the wireless RFID module 220 are depicted being transmitted to one of the receivers 440. The receiver 440, in turn, transmits the data (via wired channels 520 or wirelessly) to a computer 510 where the data are analyzed and used to control the solenoid operated water spray valve 450 that provides spray for all the carcasses in the spray zone 410. Commands to the solenoid valve may also be transmitted wirelessly or via hardwired channels 540.

Figure 6:
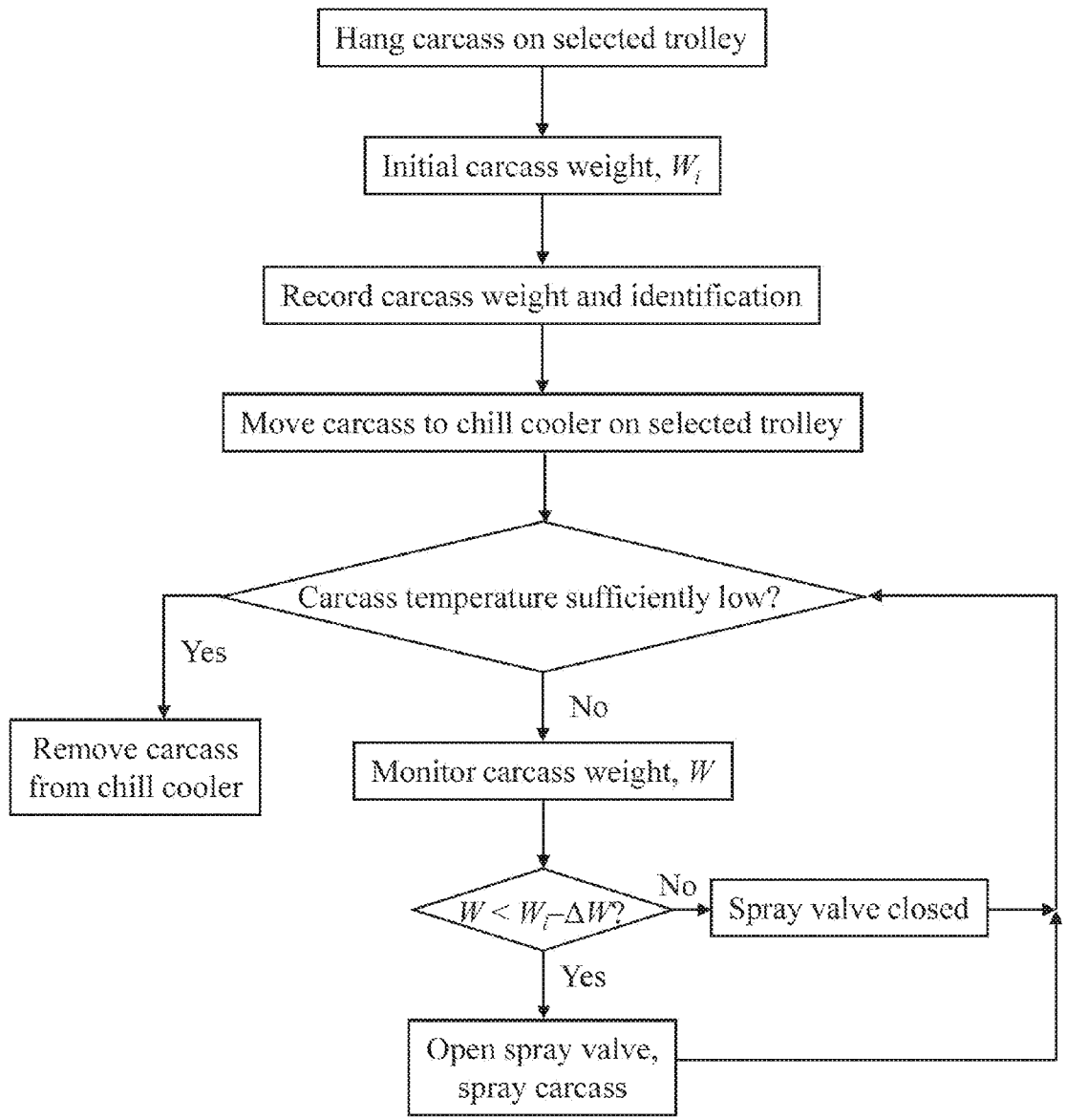
FIG. 6 shows system control information flow.

A flowchart of the process of the present invention is shown in FIG. 6. After the carcasses 310 are hung on the selected trolleys 200 as well as the non-selected trolleys, the carcasses 310 on the selected trolleys 200 are weighed to determine the initial (warm) carcass weight, $W_i$. These are the weights the system of the present invention will attempt to maintain, so these data are stored appropriately in the computer system 510. If the carcasses 310 have not already been transferred to the chill cooler, they will be at this time. Until the carcasses 310 have chilled to their final temperature, the weights, W, of the carcasses 310 on the selected trolleys 200 are monitored on a frequent basis ("continuously" in the digital sense). Whenever the instantaneous carcass weight, W, (or all the instantaneous carcass weights, W, in the case of multiple selected trolleys 200 in a single spray zone 410) is found to be lower than the respective initial weight, $W_i$, by a predetermined amount, $\Delta W$ (where $\Delta W$ may be zero), the water spray 530 is initiated by opening the appropriate solenoid-operated valve 450. If the instantaneous carcass weight, W, is not less than the initial weight, $W_i$, the appropriate solenoid-operated valve 450 is closed or kept closed.

The predetermined incremental weight value, $\Delta W$, may be determined to avoid rapid cycling of the water spray on and off. In other words, the incremental weight value, $\Delta W$, may be determined to build in some hysteresis in the system.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

The invention claimed is:

1. A method of maintaining weight of a carcass during a cooling process, the method comprising:
   (a) measuring an initial weight of the carcass;
   (b) predetermining an incremental weight, $\Delta W$;
   (c) choosing a value for $\Delta W$ to avoid rapid cycling of an intermittent water spray
   (d) reducing a temperature of the carcass by refrigeration;
   (e) repeatedly measuring an instantaneous carcass weight of the carcass during the cooling process;
   (f) intermittently spraying the carcass with water to increase carcass weight to the initial carcass weight in response to the measured instantaneous carcass weight when the instantaneous carcass weight falls below the initial carcass weight at any given time during the cooling process; and
   (g) wherein spraying the carcass with water is started at any time during the cooling process when the instantaneous carcass weight is less than the initial carcass weight minus the predetermined incremental weight, $\Delta W$, and spraying the carcass with water is stopped at any time during the cooling process when the instantaneous carcass weight is equal to or greater than the initial carcass weight.

2. The method of claim 1 additionally comprising:
(a) installing a load cell on a selected trolley, said load cell provided for measuring carcass weight; and
(b) hanging the carcass on the selected trolley.

3. The method of claim 2 wherein the load cell sends a wireless signal, said wireless signal representing the instantaneous carcass weight.

4. The method of claim 3 additionally comprising identification equipment, said identification equipment providing a wireless identification signal to a local receiver, said wireless signal providing unique identification of the selected trolley.

5. The method of claim 4 wherein the wireless identification signal received by the local receiver provides carcass location information.

6. The method of claim 2 wherein hanging the carcass on the selected trolley comprises:
(a) hanging the carcass on a gambrel; and
(b) hanging the gambrel on the selected trolley.

7. The method of claim 1 wherein intermittently spraying the carcass with water comprises actuating and deactuating a solenoid-actuated water valve.

* * * * *